US009552640B2

(12) United States Patent
Yoon et al.

(10) Patent No.: US 9,552,640 B2
(45) Date of Patent: Jan. 24, 2017

(54) METHOD OF RECOGNIZING STAIRS IN THREE DIMENSIONAL DATA IMAGE

(71) Applicant: Samsung Electronics Co., Ltd., Suwon-si (KR)

(72) Inventors: Suk June Yoon, Seoul (KR); Hyo Seok Hwang, Seoul (KR); Sung Hwan Ahn, Seongnam-si (KR); Seong Yong Hyung, Yongin-si (KR); Hyung Sok Yeo, Hwaseong-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 1062 days.

(21) Appl. No.: 13/669,960

(22) Filed: Nov. 6, 2012

(65) Prior Publication Data
US 2013/0127996 A1 May 23, 2013

(30) Foreign Application Priority Data
Nov. 23, 2011 (KR) .................. 10-2011-0122628

(51) Int. Cl.
G06K 9/00 (2006.01)
G06T 7/00 (2006.01)
H04N 13/00 (2006.01)

(52) U.S. Cl.
CPC ..... *G06T 7/004* (2013.01); *G06T 2207/10028* (2013.01); *G06T 2207/20076* (2013.01); *H04N 2013/0081* (2013.01)

(58) Field of Classification Search
CPC . G06K 9/00201; G06K 9/00664; G06T 7/004; G06T 7/0042; G06T 7/0085; B62D 57/024
See application file for complete search history.

(56) References Cited

U.S. PATENT DOCUMENTS 8,289,321 B2 * 10/2012 Gutmann ............. B62D 57/024
345/419
8,755,997 B2 * 6/2014 Au ........................ G01S 17/936
700/255
(Continued)

FOREIGN PATENT DOCUMENTS

JP   2005-182826       7/2005
JP   2009-237847 A    10/2009
(Continued)

OTHER PUBLICATIONS

Michael Ying Yang et al, Plane Detection in Point Cloud Data, Jan. 2010, Technical Report Nr. 2010 Department of Photogrammetry Institute of Geodesy and Geoinformation University of Bonn, 1-16.*

(Continued)

*Primary Examiner* — Gregory M Desire
(74) *Attorney, Agent, or Firm* — Harness, Dickey & Pierce, P.L.C.

(57) ABSTRACT

A method of recognizing stairs in a 3D data image includes an image acquirer that acquires a 3D data image of a space in which stairs are located. An image processor calculates a riser height between two consecutive treads of the stairs in the 3D data image, identifies points located between the two consecutive treads according to the calculated riser height, and detects a riser located between the two consecutive treads through the points located between the two consecutive treads. Then, the image processor calculates a tread depth between two consecutive risers of the stairs in the 3D data image, identifies points located between the two consecutive risers according to the calculated tread depth, and detects a tread located between the two consecutive risers through the points located between the two consecutive risers.

25 Claims, 17 Drawing Sheets

(56) References Cited

U.S. PATENT DOCUMENTS

| | | | |
|---|---|---|---|
| 9,305,449 B2* | 4/2016 | Goszyk | A61H 3/061 |
| 2005/0135680 A1* | 6/2005 | Kanade | G06T 7/0075 |
| | | | 382/203 |
| 2007/0204241 A1* | 8/2007 | Glennie | G06T 17/10 |
| | | | 715/782 |
| 2012/0149201 A1* | 6/2012 | Fu | H01L 21/31144 |
| | | | 438/696 |
| 2013/0127996 A1* | 5/2013 | Yoon | G06T 7/004 |
| | | | 348/46 |
| 2015/0228623 A1* | 8/2015 | Oh | H01L 27/11582 |
| | | | 257/4 |

FOREIGN PATENT DOCUMENTS

| | | |
|---|---|---|
| KR | 10-2010-0128919 | 12/2010 |
| WO | 2005/087452 A1 | 9/2005 |

OTHER PUBLICATIONS

Office Action for Japanese Patent Application No. 2012-162639 issued on Apr. 26, 2016 and English language machine translation thereof.

\* cited by examiner

1st riser

METHOD OF RECOGNIZING STAIRS IN THREE DIMENSIONAL DATA IMAGE

CROSS-REFERENCE TO RELATED APPLICATIONS

This application claims the priority benefit of Korean Patent Application No. 10-2011-0122628, filed on Nov. 23, 2011 in the Korean Intellectual Property Office, the disclosure of which is incorporated herein by reference.

BACKGROUND

1. Field

The following description relates to a method of recognizing stairs in a three-dimensional (3D) data image wherein data points corresponding to stairs are detected in a 3D data image of a space in which stairs are located.

2. Description of the Related Art

To go up stairs, a humanoid or mobile robot may need to recognize the position of the stairs with reference to the location of the robot, riser heights, or tread depths of the stairs, for example. To accomplish this, the robot may be provided with a 3D sensor to acquire a 3D data image of a space in which the stairs are located. The robot may recognize the stairs by processing and analyzing the 3D data image through a microcontroller provided in the robot.

In an Iterative Closest Point (ICP) method, which is a conventional stair recognition method, a 3D model detected from a 3D data image and a stored 3D model are matched and compared. Specifically, in the ICP method, the two 3D models are matched through repetitive calculation such that the distance between the two 3D models is minimized. Accordingly, the ICP method requires stored 3D models and also requires repetitive calculation for matching between the detected 3D model and the stored 3D models. In another conventional stair recognition method, lines are detected through vertices in the 3D data image and stairs are recognized based on the detected lines. This method recognizes treads of stairs assuming that two consecutive lines, which belong to stairs in a 3D data image, are located in the same plane. Such a method of detecting lines in a 3D data image has low stair recognition accuracy because the method is sensitive to errors due to characteristics of 3D data images.

SUMMARY

Therefore, the following description relates to a method of recognizing stairs in a 3D data image wherein the stairs are recognized by detecting risers and treads of the stairs in the 3D data image.

Additional aspects will be set forth in part in the description which follows and, in part, will be obvious from the description, or may be learned by practice of the invention.

In accordance with one aspect, a method of recognizing stairs in a 3D data image includes an image acquirer acquiring a 3D data image of a space in which stairs are located, an image processor calculating a riser height between two consecutive treads of the stairs in the 3D data image, identifying points located between the two consecutive treads according to the calculated riser height, and detecting a riser located between the two consecutive treads through the points located between the two consecutive treads, and the image processor calculating a tread depth between two consecutive risers of the stairs in the 3D data image, identifying points located between the two consecutive risers according to the calculated tread depth, and detecting a tread located between the two consecutive risers through the points located between the two consecutive risers.

The method may further include the image processor detecting a ground plane on which the stairs are located in the 3D data image using a Random Sample Consensus (RANSAC) algorithm.

Detecting the ground plane may include calculating an equation of the ground plane according to the following expression:

$$ax+by+cz+d=0,$$

where a, b, and c are components of a normal vector of the ground plane and d is a constant indicating a shortest distance between an origin and the ground plane.

The method may further include the image processor labeling the 3D data image to separate a stairs area corresponding to the stairs from the 3D data image, determining a start of the stairs from a contact line between the ground plane and the separated stairs area, and starting stair recognition.

Detecting the riser may include limiting an equation of a first tread of the stairs using parallelism of the ground plane and the first tread and estimating an equation of the first tread through points located at a predetermined range of riser heights from the ground plane.

Detecting the riser may include limiting the equation of the first tread according to the following expression:

$$ax+by+cz+d'=0,$$

where a, b, and c are components of a normal vector of the first tread, the components of the normal vector of the first tread are equal to components of a normal vector of the ground plane, and d' is a variable indicating a shortest distance between an origin and the first tread.

Detecting the riser may include the image processor comparing the equation of the ground plane and the estimated equation of the first tread and calculating a riser height between the ground plane and the estimated first tread.

Detecting the riser may include limiting an equation of the first riser using perpendicularity of the first riser to the ground plane and the estimated first tread and calculating an equation of the first riser through points located between the ground plane and the estimated first tread.

Detecting the riser may include limiting the equation of the first riser according to the following expression:

$$nx+my+lz+k=0,$$

where n, m, and l denote components of a normal vector of the first riser, the inner product of the normal vector of the first riser and the normal vectors of the ground plane and the first tread is 0, and k is a variable indicating a shortest distance between the first riser and the origin.

Detecting the riser may include the image processor limiting an equation of an upper tread among two consecutive upper and lower treads of the stairs using parallelism of the upper tread and the lower tread and estimating an equation of the upper tread through points located at a predetermined range of riser heights from the lower tread.

Detecting the riser may include limiting the equation of the upper tread according to the following expression:

$$ax+by+cz+d'=0,$$

where a, b, and c are components of a normal vector of the upper tread, the components of the normal vector of the upper tread are equal to components of a normal vector of the lower tread, and d' is a variable indicating a shortest distance between an origin and the upper tread.

Detecting the riser may include the image processor comparing the equation of the lower tread and the estimated equation of the upper tread and calculating a riser height between the lower tread and the estimated upper tread.

Detecting the riser may include limiting an equation of the riser using parallelism of the riser and an immediately lower riser and calculating an equation of the riser through points located between the lower tread and the estimated upper tread.

Detecting the riser may include limiting the equation of the riser according to the following expression:

$$nx+my+lz+k=0,$$

where n, m, and l denote components of a normal vector of the riser, the components of a normal vector of the riser are equal to components of a normal vector of the immediately lower riser, and k is a variable indicating a shortest distance between the riser and the origin.

Detecting the tread may include the image processor limiting an equation of an upper riser among two consecutive upper and lower risers of the stairs using parallelism of the upper riser and the lower riser and estimating an equation of the upper riser through points located at a predetermined range of tread depths from the lower riser.

Detecting the tread may include limiting the equation of the upper riser according to the following expression:

$$nx+my+lz+k'=0,$$

where n, m, and l are components of a normal vector of the upper riser, the components of the normal vector of the upper riser are equal to components of a normal vector of the lower riser, and k' is a variable indicating a shortest distance between an origin and the upper riser.

Detecting the tread may include the image processor comparing the equation of the lower riser and the estimated equation of the upper riser and calculating a tread depth between the lower riser and the estimated upper riser.

Detecting the tread may include limiting an equation of the tread using parallelism of the tread and an immediately lower tread and calculating an equation of the tread through points located between the lower riser and the estimated upper riser.

Detecting the plane may include limiting the equation of the tread according to the following expression:

$$ax+by+cz+d'=0,$$

where a, b, and c are components of a normal vector of the tread, the components of the normal vector of the upper tread are equal to components of a normal vector of an immediately lower tread, and d' is a variable indicating a shortest distance between an origin and the tread.

The method may further include the image processor determining whether or not an end of the stairs has been reached in the 3D data image, terminating stair recognition upon determining that the end of the stairs has been reached, and detecting a next riser and a next tread of the stairs upon determining that the end of the stairs has not been reached.

Determining whether or not the end of the stairs has been reached may include determining that the end of the stairs has been reached when a tread depth between the two consecutive risers is greater than a predetermined threshold.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
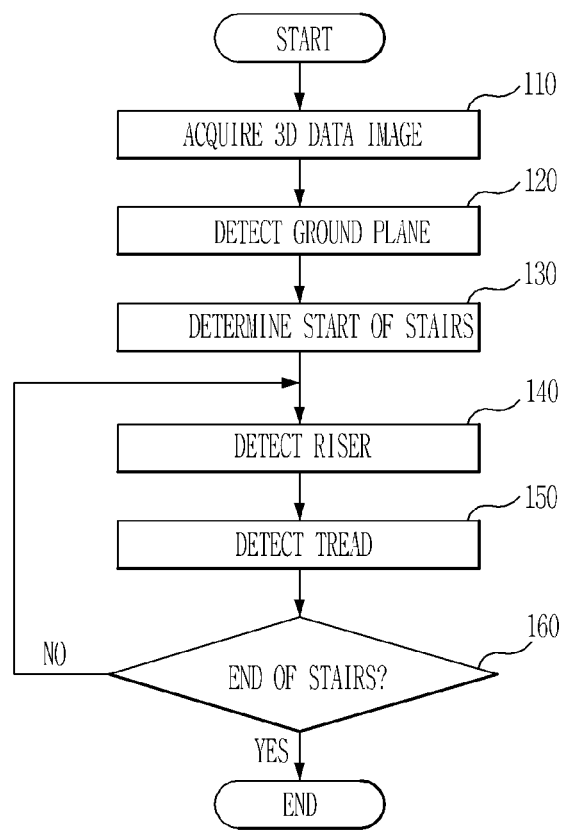
FIG. 1 is a schematic flowchart of a method of recognizing stairs in a 3D data image according to an embodiment.

Reference will now be made in detail to the embodiments, examples of which are illustrated in the accompanying drawings, wherein like reference numerals refer to like elements throughout.

FIG. 1 is a schematic flowchart of a method of recognizing stairs in a 3D data image according to an embodiment.

As shown in FIG. 1, an image acquirer in a robot may acquire a 3D data image of a space in which stairs are located (110). Here, the 3D data image may be, but is not limited to, a 3D point cloud image, and the method of recognizing stairs in a 3D data image may be applied to any image including data points having 3D coordinates of x, y, and z. A 3D coordinate system may be defined in the 3D data image. For example, a 3D coordinate system may be defined such that the center of the robot is set to the origin, the forward direction of the robot is set to the x axis, the lateral direction of the robot is set to the y axis, and the upward direction of the robot is set to the z axis.

An image processor may obtain an equation of (or corresponding to) a ground plane on which stairs are located from the 3D data image using a Random Sample Consensus (RANSAC) algorithm (120). A detailed description of the RANSAC algorithm is omitted herein because the RANSAC algorithm is well-known to those having ordinary skill in the art. A detailed method of obtaining an equation of a ground plane from the 3D data image is described below in detail with reference to FIGS. 6A and 6B.

Figure 6A:
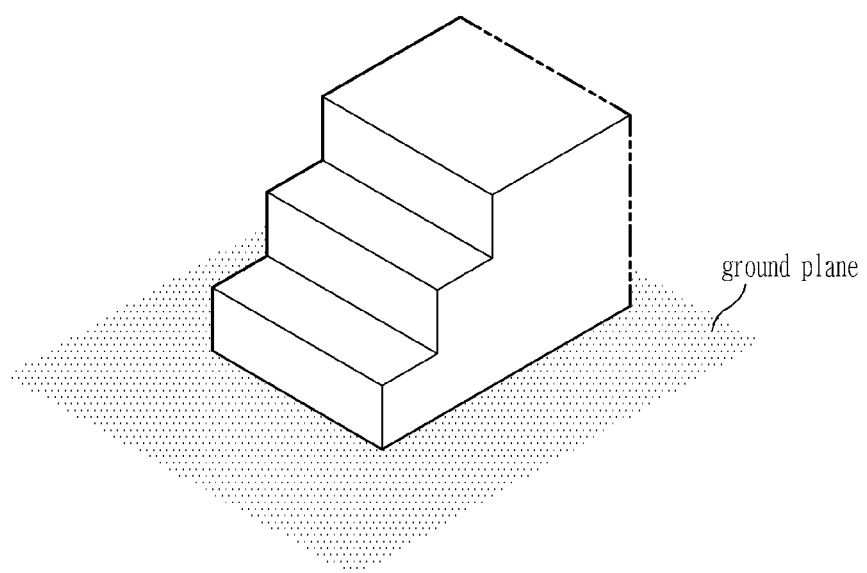
FIGS. 6A and 6B illustrate a method of detecting a ground plane in a 3D data image according to an embodiment.
Figure 6B:
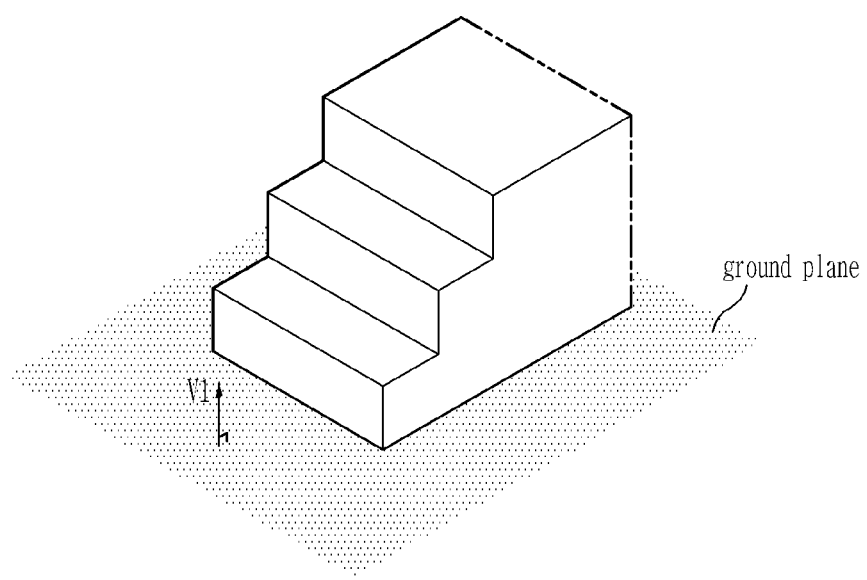

FIGS. 6A and 6B illustrate a method of detecting a ground plane in a 3D data image according to an embodiment.

As shown in FIG. 6A, the image processor may detect a ground plane on which stairs are located from a 3D data image using a RANSAC algorithm and may obtain a ground plane equation for the detected ground plane according to Expression 1.

$$ax+by+cz+d=0 \qquad \text{[Expression 1]}$$

In Expression 1, a, b, and c are components of a normal vector v1 of the ground plane and d is a constant indicating the shortest distance between the origin and the ground plane as shown in FIG. 6B.

The image processor may determine the start of the stairs and then begin stair recognition from the determined start (130). A detailed method for the image processor to determine the start of the stairs in the 3D data image is described below in detail with reference to FIGS. 2 and 7.

Figure 2:
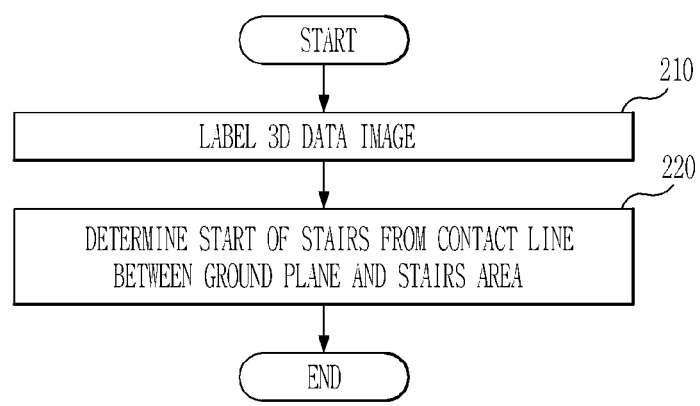
FIG. 2 is a schematic flowchart of a method of determining a start of stairs in a 3D data image according to an embodiment.

FIG. 2 is a schematic flowchart of a method of determining a start of stairs in a 3D data image according to an embodiment.

As shown in FIG. 2, the image processor performs labeling on a 3D data image to separate a stairs area from the 3D data image (210). Specifically, the image processor may label points other than a ground plane in the 3D data image to separate a stairs area from the 3D data image. The image processor may separate a stairs area from the 3D data image by determining that a point group which has the maximum number of points from among point groups generated by labeling is the stairs area.

A basic method for the image processor to label the 3D data image is described as follows. First, the image processor initializes labels and label indices of points, which are to be labeled in the 3D data image, to 0. Then, the image processor determines whether or not a label has been allocated to each point by checking whether or not the label of the point is 0 while searching all points.

When no label has been allocated to a given point, the image processor searches for points located within a predetermined distance from the given point. When a point to which a label has been allocated is present from among the given point and the points located within the predetermined distance, the image processor allocates the same label as the label allocated to the point to points to which no labels have been allocated from among the given point and the points located within the predetermined distance.

When a point to which a label has been allocated is not present from among the given point and the points located within the predetermined distance, the image processor increases the label index by 1 and allocates a label corresponding to the label index to the given point and the points located within the predetermined distance.

When a label has been allocated to the given point, the image processor repeatedly performs a procedure to search for a next point and determine whether or not a label has been allocated to the next point.

That is, while 8 pixels adjacent to a given pixel are searched for and a label is allocated to the points in the 2D labeling method, pixels located within a predetermined distance from a given pixel are searched for and a label is allocated to the points in the 3D labeling method.

Figure 7:
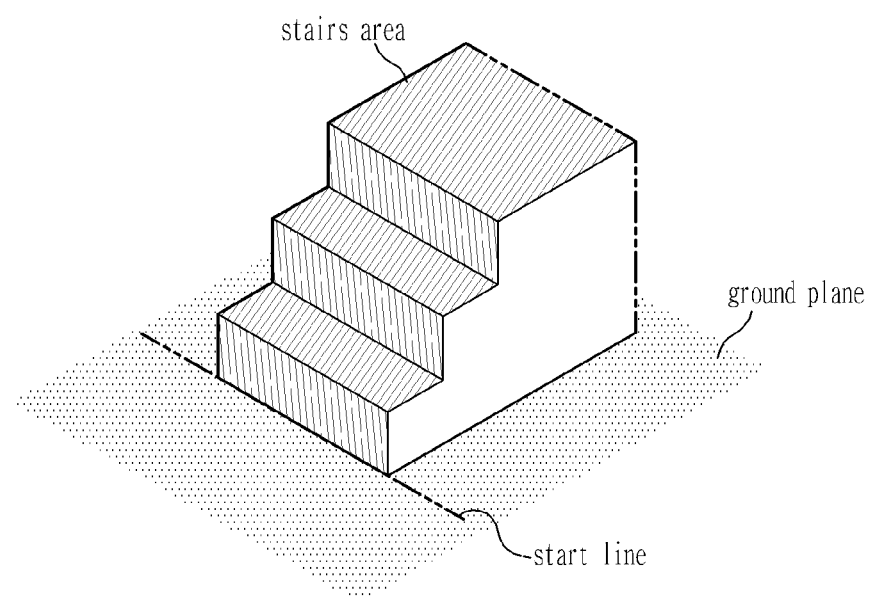
FIG. 7 schematically illustrates a method of determining a start of stairs in a 3D data image according to an embodiment.

FIG. 7 schematically illustrates a method of determining a start of stairs in a 3D data image according to an embodiment.

As shown in FIG. 7, when the image acquirer has acquired a 3D data image of stairs at a specific angle in front of the stairs, the image processor may determine that a group of points that constitute risers and treads of the stairs is a stairs area. Although FIG. 7 shows a perspective view of the stairs for better understanding of the method of separating a stairs area from a 3D data image, side walls of stairs (i.e., stringer faces) are not often exposed and the image acquirer generally acquires a 3D data image of the front of stairs.

The image processor may determine the start of the stairs through a contact line between the ground plane and the separated stairs area (220). The image processor determines the start of the stairs and starts stair recognition from the start line of the stairs. The image processor performs stair recognition only on the separated stairs area.

The image processor may determine the start of the stairs through the contact line between the ground plane and the stairs area as described above. For example, the image processor may detect vertices of a first riser in the 3D data image and calculate an equation of the contact line using parallelism of the contact line and the ground plane. Here, the detected contact line corresponds to the start line of the stairs.

The image processor may detect a riser located between two consecutive treads through points located between the two treads (140). That is, the image processor may calculate an equation of a plane including the points located between the two treads, which is an equation of the riser located between the two treads.

The image processor may detect points located between the two treads through a riser height (i.e., rise) between the two treads by comparing the equations of the two treads. A method for the image processor to detect a riser of stairs in a 3D data image is described below in detail with reference to FIGS. 3, 8A to 8D.

Figure 3:
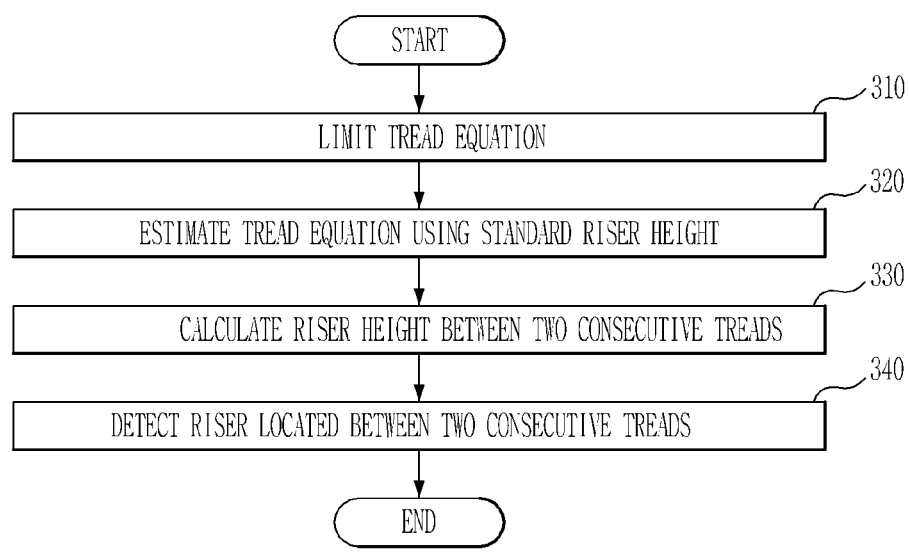
FIG. 3 is a schematic flowchart illustrating a method of detecting a riser of stairs in a 3D data image according to an embodiment.

FIG. 3 is a schematic flowchart illustrating a method of detecting a riser of stairs in a 3D data image according to an embodiment.

How the image processor detects a riser is described below with reference to FIG. 3. First, we may assume that two consecutive treads are parallel to each other. The image processor may limit an equation of the upper tread using parallelism of consecutive upper and lower treads of stairs (310). The ground plane on which the stairs are located is also considered a tread. The image processor may calculate an equation of the ground plane in the 3D data image using the RANSAC algorithm as described above.

FIGS. 8A to 8D schematically illustrate a method of detecting a riser of stairs in a 3D data image according to an embodiment.

Figure 8A:
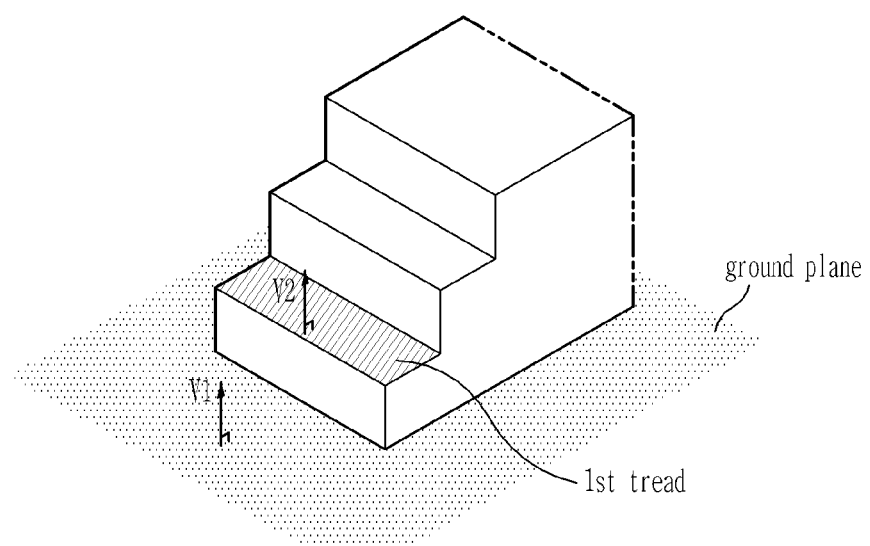
FIGS. 8A to 8D schematically illustrate a method of detecting a riser of stairs in a 3D data image according to an embodiment.

As shown in FIG. 8A, since the ground plane on which the stairs are located and the 1st tread (or 1st stair plane) are parallel to each other, the components of a normal vector v1 of the ground plane and the components of a normal vector v2 of the 1st tread are equal. The components of each of the normal vectors of all treads of the stairs are equal to the components of the normal vector of the ground plane while the shortest distance between each tread and the origin differs from each other. Thus, the image processor may limit the equation of an upper tread according to the following Expression 2.

$$ax+by+cz+d'=0 \qquad \text{[Expression 2]}$$

In Expression 2, a, b, and c denote components of the normal vector of the upper tread which are equal to the components of the normal vector of the lower tread and d' denotes the shortest distance between the upper tread and the origin. In the case of FIG. 8A, the equation of the first tread may be limited according to Expression 2. In this case, a, b, and c may represent the components of the normal vector of the first tread.

The image processor may estimate the equation of the upper tread using a predetermined riser height (i.e., rise) (320). Here, the image processor may use riser heights of standard stairs in a predetermined range of riser heights. Standard stairs have compulsory or recommended dimensions according to construction regulations of each country. For example, the range of standard riser heights is from approximately 15 cm to approximately 20 cm and the range of standard tread depths is from approximately 25 cm to approximately 30 cm.

Figure 8B:
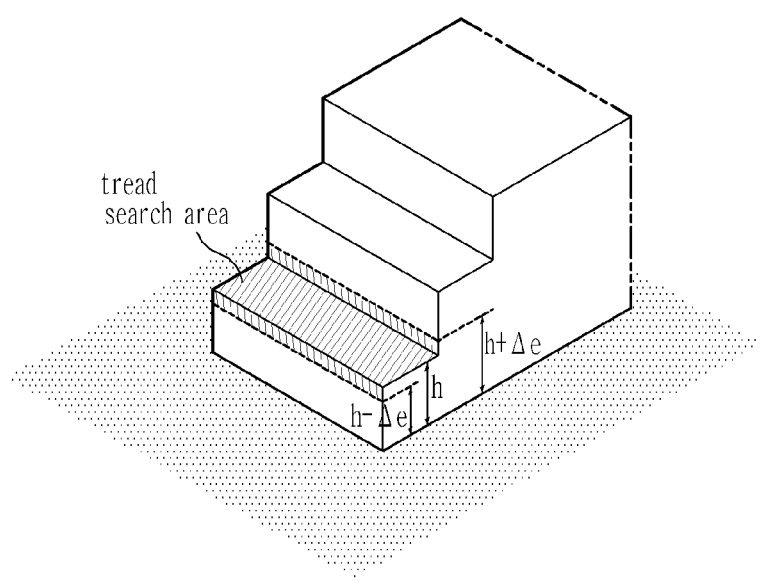

As shown in FIG. 8B, the image processor may estimate an equation of the first tread through points located at a predetermined riser height in a predetermined range of riser heights from the ground plane. Here, when the predetermined riser height is h, the predetermined range of riser heights is from h−Δe to h+Δe. The image processor performs searching using the predetermined range of riser heights as a tread search area. Specifically, the image processor substitutes points located at the predetermined range of riser heights from the ground plane into the first tread equation limited according to Expression 2 and selects the most representative value of d' according to the substitution result to estimate an equation of the first tread. Here, various methods may be used to select the most representative value of d'. For example, the image processor may select, as the most representative value, the most frequently obtained value of d' according to the result of substitution into the limited first tread equation.

Although FIG. 8B illustrates a method of estimating only the equation of the first tread, it will be apparent to those skilled in the art that equations of all treads may be estimated using the same method.

The image processor may calculate a riser height (i.e., a rise) defined between a lower tread and an upper tread by comparing the equation of the lower tread and the estimated equation of the upper tread (330). Since the image processor has selected the value d' which indicates the shortest distance between the upper tread and the origin in Expression 2, the image processor may calculate the riser height between the lower tread and the upper tread by comparing the equation of the lower tread and the estimated equation of the upper tread. For example, the image processor may calculate the riser height between the ground plane and the first tread by comparing the equation of the ground plane and the estimated equation of the first tread. When the z coordinate value of the points of the ground plane is 0, the image processor may calculate the riser height between the ground plane and the first tread through the difference between d and d'.

The image processor may detect a riser located between a lower tread and an upper tread which are consecutive through points located between the two treads (340). The image processor may limit an equation of the riser using parallelism of the riser and an immediately lower riser and may accurately calculate the equation of the riser by substituting the points located between the two treads into the limited equation of the riser.

Figure 8C:
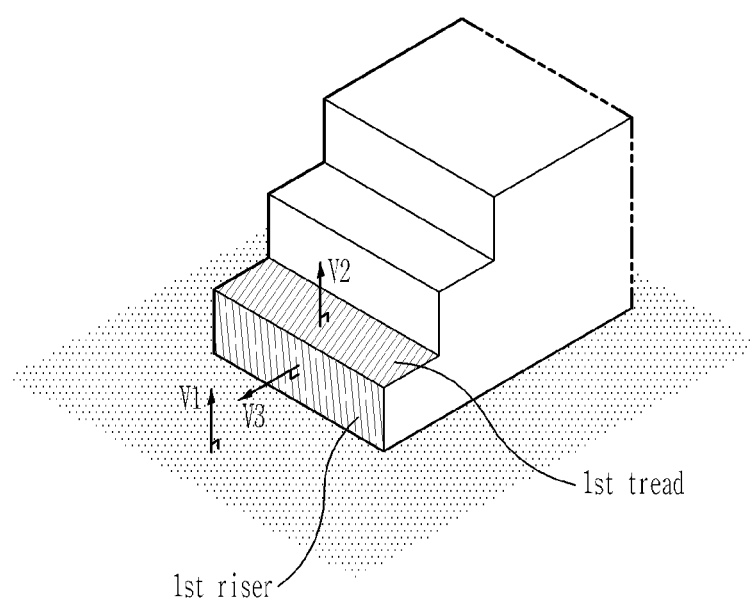

Referring to FIG. 8C, the first riser is perpendicular to the two consecutive treads, i.e., the ground plane and the first tread. Accordingly, the image processor may limit the equation of the first riser according to the following Expression 3.

$$nx+my+lz+k=0 \qquad \text{[Expression 3]}$$

Here, n, m, and l denote components of the normal vector of the first riser, the inner product of the normal vector of the first riser and the normal vectors of the two treads is 0, and k is a variable indicating the shortest distance between the first riser and the origin.

Figure 8D:
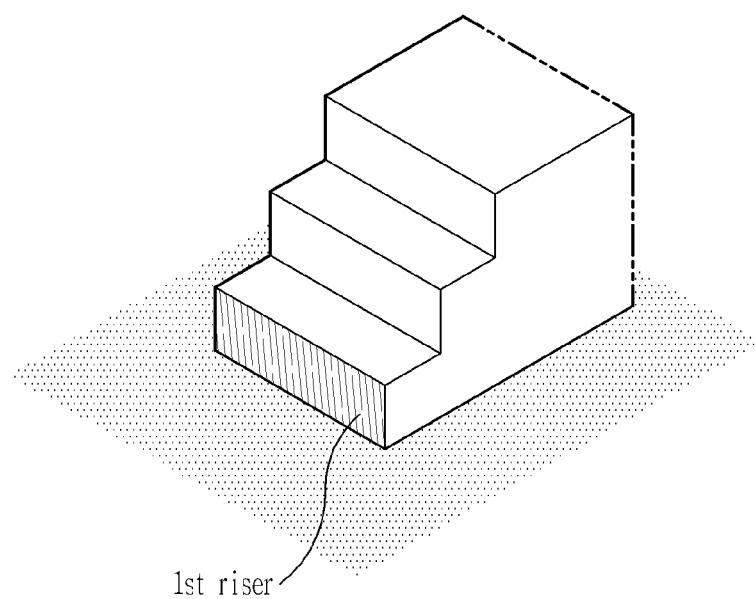

Referring to FIG. 8D, the image processor may calculate the equation of the first riser through both the fact that the inner product of the normal vector of the first riser and the normal vectors of the two treads (the ground plane and the first tread) is 0 and the result of substitution of points located between the two treads into the equation of the first riser limited according to Expression 3. In this manner, the image processor may detect the first riser.

Unlike the method of detecting the first riser which has been described above, it may be possible to limit an equation of an arbitrary one of the second and subsequent risers, which is located between two consecutive treads, using parallelism of the riser and the immediately lower riser. The image processor may limit the equation of an arbitrary one of the second and subsequent risers according to Expression 3 described above, calculate the equation of the riser through points located between the two treads, and detect the riser located between the two treads. In this case, n, m, and l denote the components of the normal vector of the riser, and the components thereof are equal to the components of the normal vector of the lower riser, and k is a variable indicating the shortest distance between the riser and the origin. The image processor may calculate the equation of the riser through the result of substitution of points located between the two treads into the equation of the arbitrary riser.

The image processor may detect a tread located between two consecutive risers through points located between the two risers (150). That is, the image processor may calculate an equation of a plane which includes the points located between the two risers. This plane equation corresponds to an equation of the tread located between the two risers.

The image processor may detect points located between the two risers through a width (i.e., a tread depth) between the two risers. Here, the image processor may calculate the tread depth between the two risers by comparing the equations of the two risers. A method of detecting a tread of stairs in a 3D data image is described below in detail with reference to FIGS. 4 and 9A to 9D.

Figure 4:
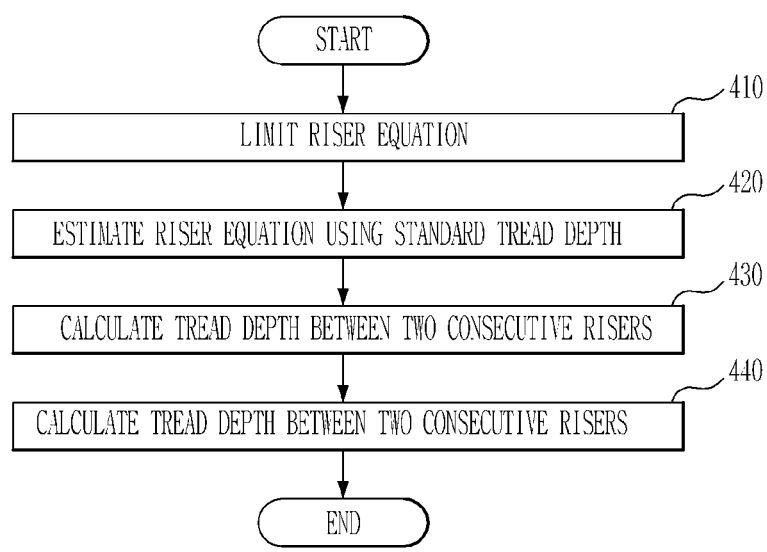
FIG. 4 is a schematic flowchart of a method of detecting a tread of stairs in a 3D data image according to an embodiment.

FIG. 4 is a schematic flowchart of a method of detecting a tread of stairs in a 3D data image according to an embodiment.

How the image processor detects a tread is described below with reference to FIG. 4. First, we may assume that two consecutive risers are parallel to each other. Thus, the image processor may limit an equation of the upper riser using parallelism of the lower and upper consecutive risers (410). The image processor may calculate an equation of the first riser in the 3D data image using perpendicularity of the first riser to the ground plane and the first tread as described above.

FIGS. 9A to 9D schematically illustrate a method of detecting a tread of stairs in a 3D data image according to an embodiment.

Figure 9A:
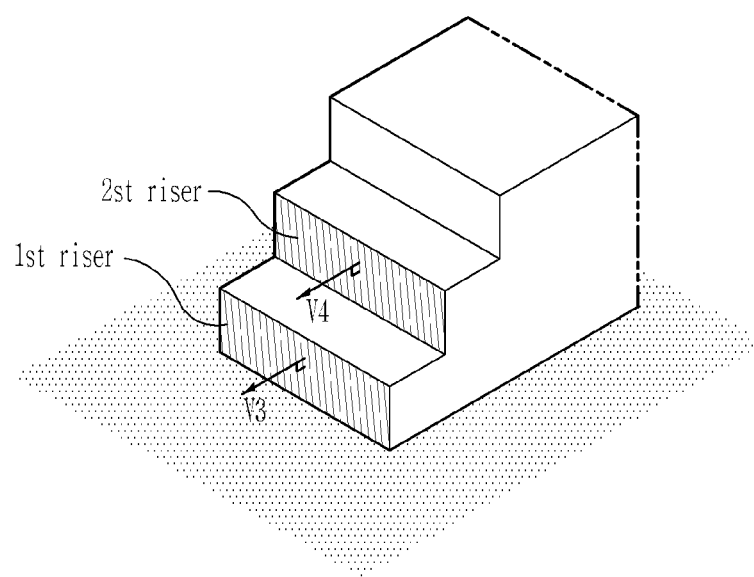
FIGS. 9A to 9D schematically illustrate a method of detecting a tread of stairs in a 3D data image according to an embodiment.

As shown in FIG. 9A, since a first riser and a second riser are parallel to each other, the components of a normal vector v3 of the first riser and the components of a normal vector v4 of the second riser are equal. The components of normal vectors of all risers are equal while the shortest distance between each riser and the origin is different. Thus, the image processor may limit the equation of an upper riser according to the following Expression 4.

$$nx+my+lz+k'=0 \qquad \text{[Expression 4]}$$

In Expression 4, n, m, and l denote components of the normal vector of the upper riser which are equal to the components of the normal vector of the lower riser and k' is a variable indicating the shortest distance between the upper riser and the origin. In the case of FIG. 9A, the equation of the second riser may be limited according to Expression 4. In this case, n, m, and l may represent the components of the normal vector v4 of the second riser.

The image processor may estimate the equation of the upper riser using a predetermined tread depth (420). Here, the image processor may use tread depths of standard stairs in a predetermined range of tread depths, similar to the range of riser heights described above.

Figure 9B:
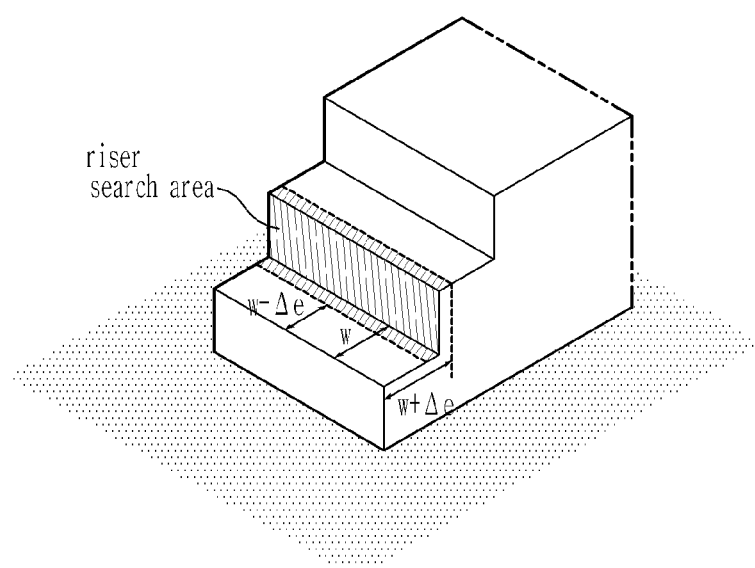

As shown in FIG. 9B, the image processor may estimate an equation of the second riser through points located at a predetermined tread depth in a predetermined range of tread depths from the first riser. Here, when the predetermined tread depth is w, the predetermined range of tread depths is from w−Δe to w+Δe. The image processor performs searching using the predetermined range of tread depths as a riser search area. Specifically, the image processor substitutes points located at the predetermined range of tread depths from the first riser into the second riser equation limited according to Expression 4 and selects the most representative value of k' according to the substitution result to estimate an equation of the second riser. Here, various methods may be used to select the most representative value of k'. For example, the image processor may select, as the most representative value, the most frequently obtained value of k' according to the result of substitution into the limited second riser equation.

Although FIG. 9B illustrates a method of estimating only the equation of the second riser, it will be apparent to those skilled in the art that equations of all remaining risers may be estimated using the same method.

The image processor may calculate a depth (i.e., a tread depth) defined between the lower riser and the upper riser by comparing the equation of the lower riser and the estimated equation of the upper riser (430). Since the image processor has selected the value k' which indicates the shortest distance between the upper riser and the origin in Expression 4, the image processor may calculate the tread depth between the lower riser and the upper riser by comparing the equation of the lower riser and the estimated equation of the upper riser. For example, the image processor may calculate the tread depth between the first riser and the second riser by comparing the equation of the first riser and the estimated equation of the second riser. When the x coordinate value of the points of the first riser is 0, the image processor may calculate the tread depth between the first riser and the second riser through the difference between k and k'.

The image processor may detect a tread located between a lower riser and an upper riser which are consecutive through points located between the two risers (440). The image processor may limit an equation of the tread using parallelism of the tread to an immediately lower tread and may accurately calculate the equation of the tread by substituting the points located between the two treads into the limited equation of the tread.

Figure 9C:
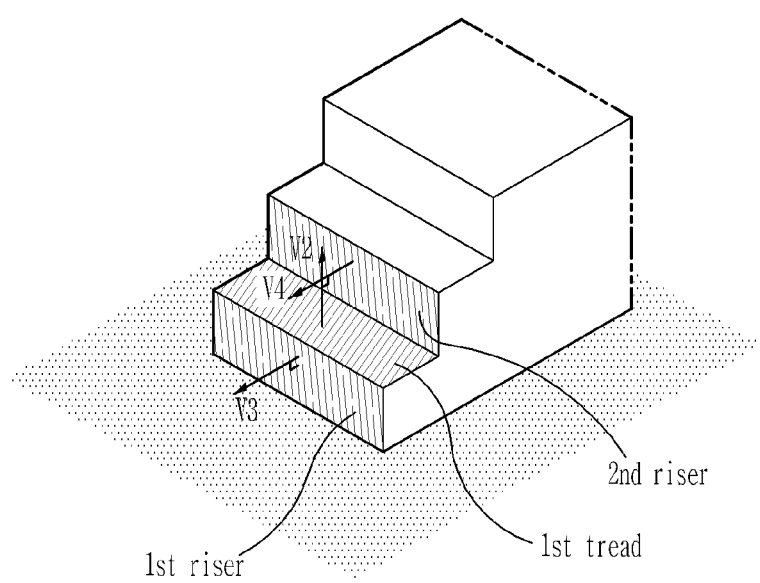

Referring to FIG. 9C, the first tread is perpendicular to the two consecutive risers, i.e., the first riser and the second riser. In addition, the first tread is parallel to the immediately lower tread, i.e., the ground plane. Accordingly, the image processor may limit the equation of the first tread according to the above Expression 2. In this case, a, b, and c are components of the normal vector of the first tread which are equal to the components of the normal vector of the ground plane and d' is a variable indicating the shortest distance between the first tread and the origin.

Figure 9D:
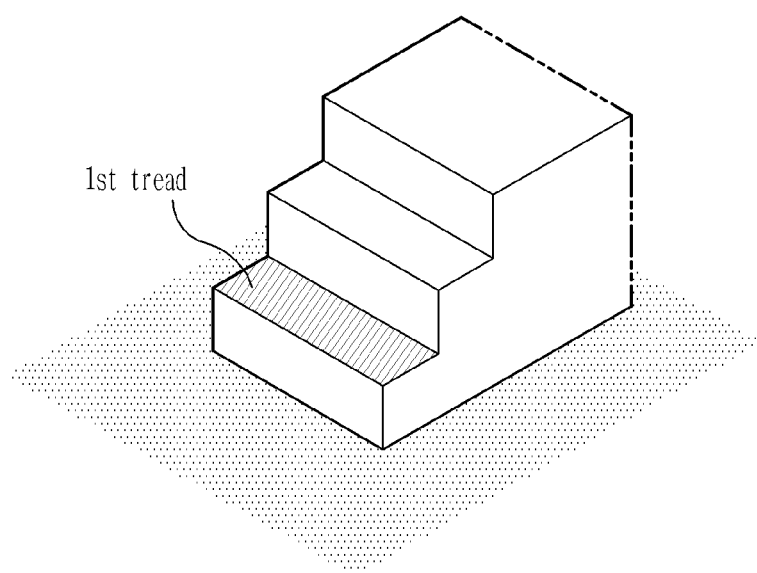

Referring to FIG. 9D, the image processor may calculate the equation of the first tread through the result of substitution of points located between the two risers into the equation of the first tread limited according to Expression 2.

The image processor may calculate equations of the remaining treads using the same method as described above. For example, the image processor may limit an equation of each of the treads located between two consecutive risers according to Expression 2 using parallelism of the second tread to the first tread, parallelism of the third tread to the second tread, and so on. The image processor may calculate an equation of the tread through the result of substitution of points located between the two risers into the limited equation of the tread.

The image processor may determine whether or not the end of the stairs has been reached (160). The image processor may terminate stair recognition upon determining that the end of the stairs has been reached. Upon determining that the end of the stairs has not been reached, the image processor repeatedly performs operations 140 and 150 to calculate an equation of a next riser and an equation of a next tread. Upon detecting a riser and a tread of a next set of stairs, the image acquirer may again acquire a 3D data image of a space in which the stairs are located. A method of determining the end of stairs in a 3D data image is described in detail with reference to FIG. 10.

Figure 10:
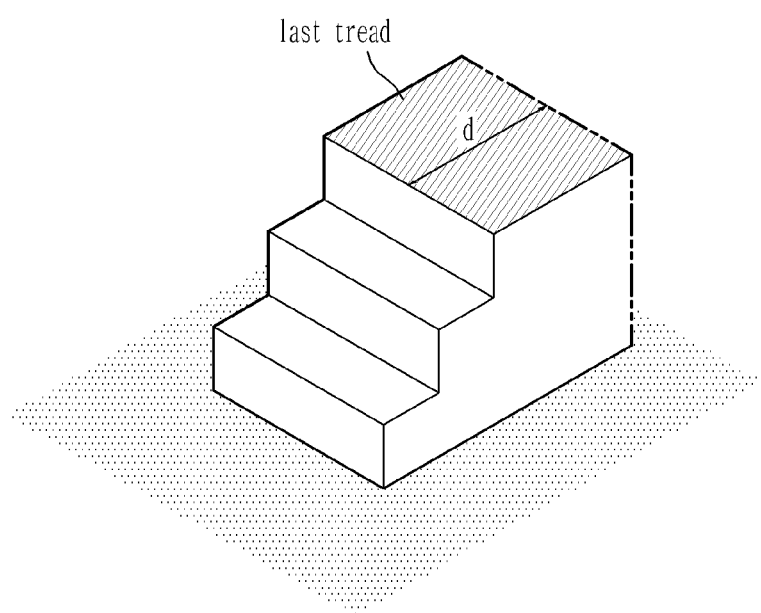
FIG. 10 schematically illustrates a method of determining whether or not an end of stairs has been reached in a 3D data image according to an embodiment.

With reference to FIG. 10, the image processor may calculate a tread depth between two consecutive risers in the tread detection procedure. Here, when the calculated tread depth d between the two risers is greater than a predetermined threshold, for example, when the calculated tread depth d is greater than twice a tread depth between two previous risers, the image processor determines that the end of the stairs has been reached and that the detected tread is the last tread of the stairs.

Figure 5:
FIG. 5 is a schematic block diagram of a system that recognizes stairs in a 3D data image according to an embodiment.

FIG. 5 is a schematic block diagram of a system that recognizes stairs in a 3D data image according to an embodiment.

As shown in FIG. 5, the stair recognition system includes an image acquirer 510 to acquire a 3D data image, an image processor 520 to process the 3D data image to recognize stairs, and an output unit 530 to output the result of stair recognition of the image processor. The image acquirer 510 acquires a 3D data image of a space in which stairs are located. For example, the image acquirer 510 may include a stereo camera, a TOF camera, an LRF sensor, or a Kinect sensor, for example. The image processor 520 may include a microcontroller to process a 3D data image acquired by the image acquirer 510 to recognize stairs, and the output unit 530 may include a display unit to output the result of stair recognition of the image processor. The stair recognition system may be installed in a humanoid robot or a mobile robot, for example.

As is apparent from the above description, according to the embodiments, stairs are recognized by detecting risers and treads of the stairs in a 3D data image. Therefore, the stair recognition method according to an embodiment does not require stored 3D models and also does not require repetitive calculation for matching between a detected 3D model and stored 3D models. Thus, it may be possible to quickly recognize stairs in a 3D data image. In addition, since risers or treads of stairs are not detected through consecutive lines in a 3D data image, it may be possible to recognize stairs in a 3D data image with high accuracy without being sensitive to errors.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of recognizing stairs in a 3D data image, the method comprising:
    acquiring, by an image sensor, a 3D data image of a space in which stairs are located;
    calculating, by an image processor, a riser height between two consecutive treads of the stairs in the 3D data image, identifying points located between the two consecutive treads according to the calculated riser height, and detecting a riser located between the two consecutive treads through the points located between the two consecutive treads by limiting an equation of a first tread of the stairs using parallelism of a ground plane and the first tread and estimating an equation of the first tread through points located at a range of riser heights from the ground plane;
    calculating, by the image processor, a tread depth between two consecutive risers of the stairs in the 3D data image, identifying points located between the two consecutive risers according to the calculated tread depth, and detecting a tread located between the two consecutive risers through the points located between the two consecutive risers; and
    applying, by the image processor, the detected riser and the detected tread to a path for traveling the stairs.

2. The method according to claim 1, further comprising detecting the ground plane on which the stairs are located in the 3D data image using a Random Sample Consensus (RANSAC) algorithm.

3. The method according to claim 2, wherein detecting the ground plane comprises calculating an equation of the ground plane according to the following expression:

$$ax+by+cz+d=0,$$

where a, b, and c are components of a normal vector of the ground plane and d is a constant indicating a shortest distance between an origin and the ground plane.

4. The method according to claim 2, further comprising labeling the 3D data image to separate a stairs area corresponding to the stairs from the 3D data image, determining a start of the stairs from a contact line between the ground plane and the separated stairs area, and starting stair recognition.

5. The method according to claim 2, wherein detecting the riser comprises limiting the equation of the first tread according to the following expression:

$$ax+by+cz+d'=0,$$

where a, b, and c are components of a normal vector of the first tread, the components of the normal vector of the first tread are equal to components of a normal vector of the ground plane, and d' is a variable indicating a shortest distance between an origin and the first tread.

6. The method according to claim 2, wherein detecting the riser comprises comparing the equation of the ground plane and the estimated equation of the first tread and calculating a riser height between the ground plane and the estimated first tread.

7. The method according to claim 6, wherein detecting the riser comprises limiting an equation of a first riser of the stairs using perpendicularity of the first riser to the ground plane and the estimated first tread and calculating an equation of the first riser through points located between the ground plane and the estimated first tread.

8. The method according to claim 7, wherein detecting the riser comprises limiting the equation of the first riser according to the following expression:

$$nx+my+lz+k=0,$$

where n, m, and l denote components of a normal vector of the first riser, the inner product of the normal vector of the first riser and the normal vectors of the ground plane and the first tread is 0, and k is a variable indicating a shortest distance between the first riser and the origin.

9. The method according to claim 1, wherein detecting the riser comprises limiting an equation of an upper tread among two consecutive upper and lower treads of the stairs using parallelism of the upper tread and the lower tread and estimating an equation of the upper tread through points located at a range of riser heights from the lower tread.

10. The method according to claim 9, wherein detecting the riser comprises limiting the equation of the upper tread according to the following expression:

$$ax+by+cz+d'=0,$$

where a, b, and c are components of a normal vector of the upper tread, the components of the normal vector of the upper tread are equal to components of a normal vector of the lower tread, and d' is a variable indicating a shortest distance between an origin and the upper tread.

11. The method according to claim 9, wherein detecting the riser comprises comparing the equation of the lower tread and the estimated equation of the upper tread and calculating a riser height between the lower tread and the estimated upper tread.

12. The method according to claim 11, wherein detecting the riser comprises limiting an equation of the riser using parallelism of the riser and an immediately lower riser and calculating an equation of the riser through points located between the lower tread and the estimated upper tread.

13. The method according to claim 12, wherein detecting the riser comprises limiting the equation of the riser according to the following expression:

$$nx+my+lz+k=0,$$

where n, m, and l denote components of a normal vector of the riser, the components of a normal vector of the riser are equal to components of a normal vector of the immediately lower riser, and k is a variable indicating a shortest distance between the riser and the origin.

14. The method according to claim 9, wherein detecting the tread comprises limiting the equation of the upper riser according to the following expression:

$$nx+my+lz+k'=0,$$

where n, m, and l are components of a normal vector of the upper riser, the components of the normal vector of the upper riser are equal to components of a normal vector of the lower riser, and k' is a variable indicating a shortest distance between an origin and the upper riser.

15. The method according to claim 1, further comprising determining whether or not an end of the stairs has been reached in the 3D data image, terminating stair recognition upon determining that the end of the stairs has been reached, and detecting a next riser and a next tread of the stairs upon determining that the end of the stairs has not been reached.

16. The method according to claim 15, wherein determining whether or not the end of the stairs has been reached comprises determining that the end of the stairs has been reached when a tread depth between the two consecutive risers is greater than a threshold.

17. A non-transitory computer-readable recording medium storing a program to implement the method of claim 1.

18. A method of recognizing stairs in a 3D data image, the method comprising:
    acquiring, by an image sensor, a 3D data image of a space in which stairs are located;
    calculating, by an image processor, a riser height between two consecutive treads of the stairs in the 3D data image, identifying points located between the two consecutive treads according to the calculated riser height, and detecting a riser located between the two consecutive treads through the points located between the two consecutive treads;
    calculating, by the image processor, a tread depth between two consecutive risers of the stairs in the 3D data image, identifying points located between the two consecutive risers according to the calculated tread depth, and detecting a tread located between the two consecutive risers through the points located between the two consecutive risers by limiting an equation of an upper riser among two consecutive upper and lower risers of the stairs using parallelism of the upper riser and the lower riser and estimating an equation of the upper riser through points located at a range of tread depths from the lower riser; and
    applying, by the image processor, the detected riser and the detected tread to a path for traveling the stairs.

19. The method according to claim 18, wherein detecting the tread comprises comparing the equation of the lower riser and the estimated equation of the upper riser and calculating a tread depth between the lower riser and the estimated upper riser.

20. The method according to claim 19, wherein detecting the tread comprises limiting an equation of the tread using parallelism of the tread and an immediately lower tread and calculating an equation of the tread through points located between the lower riser and the estimated upper riser.

21. The method according to claim 20, wherein detecting the plane comprises limiting the equation of the tread according to the following expression:

$$ax+by+cz+d'=0,$$

where a, b, and c are components of a normal vector of the tread, the components of the normal vector of the upper tread are equal to components of a normal vector of an immediately lower tread, and d' is a variable indicating a shortest distance between an origin and the tread.

22. A stair recognition system comprising:
an image sensor configured to acquire a 3D data image of a space in which stairs are located; and
an image processor configured to,
    calculate a riser height between two consecutive treads of the stairs in the 3D data image;
    identify points located between the two consecutive treads according to the calculated riser height,
    detect a riser located between the two consecutive treads through the points located between the two consecutive treads by limiting an equation of a first tread of the stairs using parallelism of a ground plane and the first tread and estimating an equation of the first tread through points located at a range of riser heights from the ground plane,
    calculate a tread depth between two consecutive risers of the stairs in the 3D data image,
    identify points located between the two consecutive risers according to the calculated tread depth,
    detect a tread located between the two consecutive risers through the points located between the two consecutive risers, and
    apply the detected riser and the detected tread to a path for traveling the stairs.

23. The stair recognition system of claim 22,
wherein the image processor is configured to:
detect the ground plane on which the stairs are located in the 3D data image;
label the 3D data image to separate a stairs area corresponding to the stairs from the 3D data image; and
determine a start of the stairs from a contact line between the ground plane and the separated stairs area.

24. The stair recognition system of claim 22, wherein the 3D image comprises a 3D point cloud image.

25. The stair recognition system of claim 22, further comprising:
    a display configured to output the result of stair recognition of the image processor.

* * * * *